Patented Mar. 12, 1929.

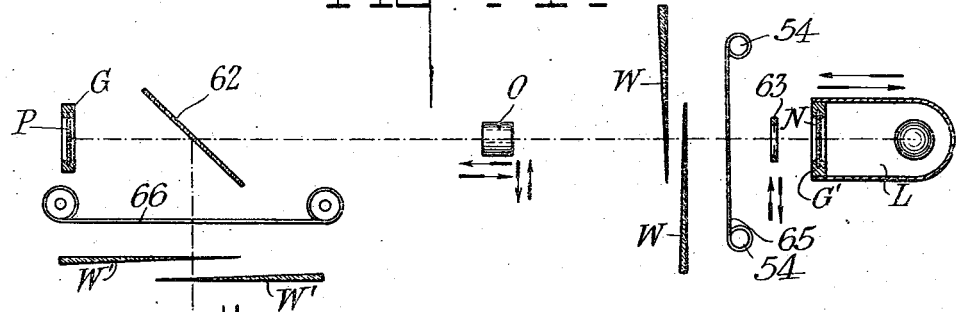
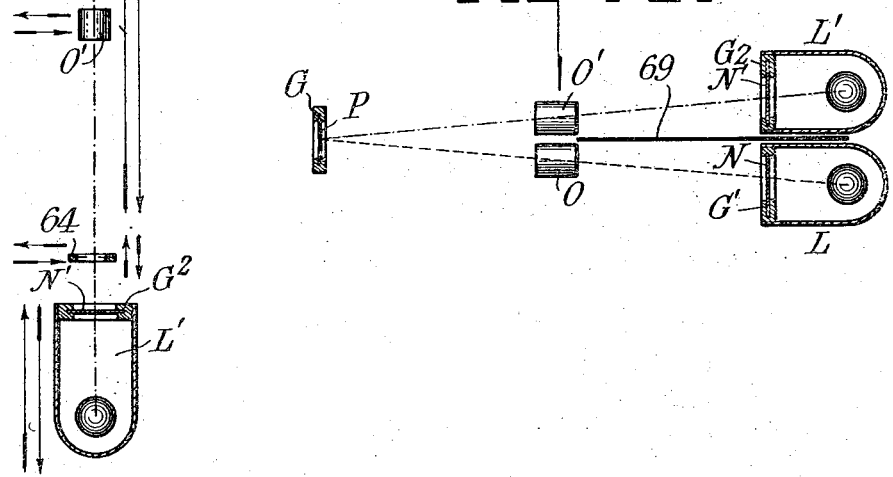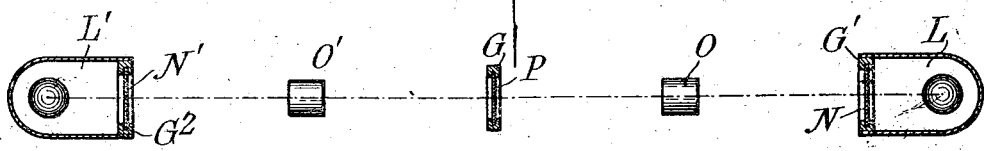

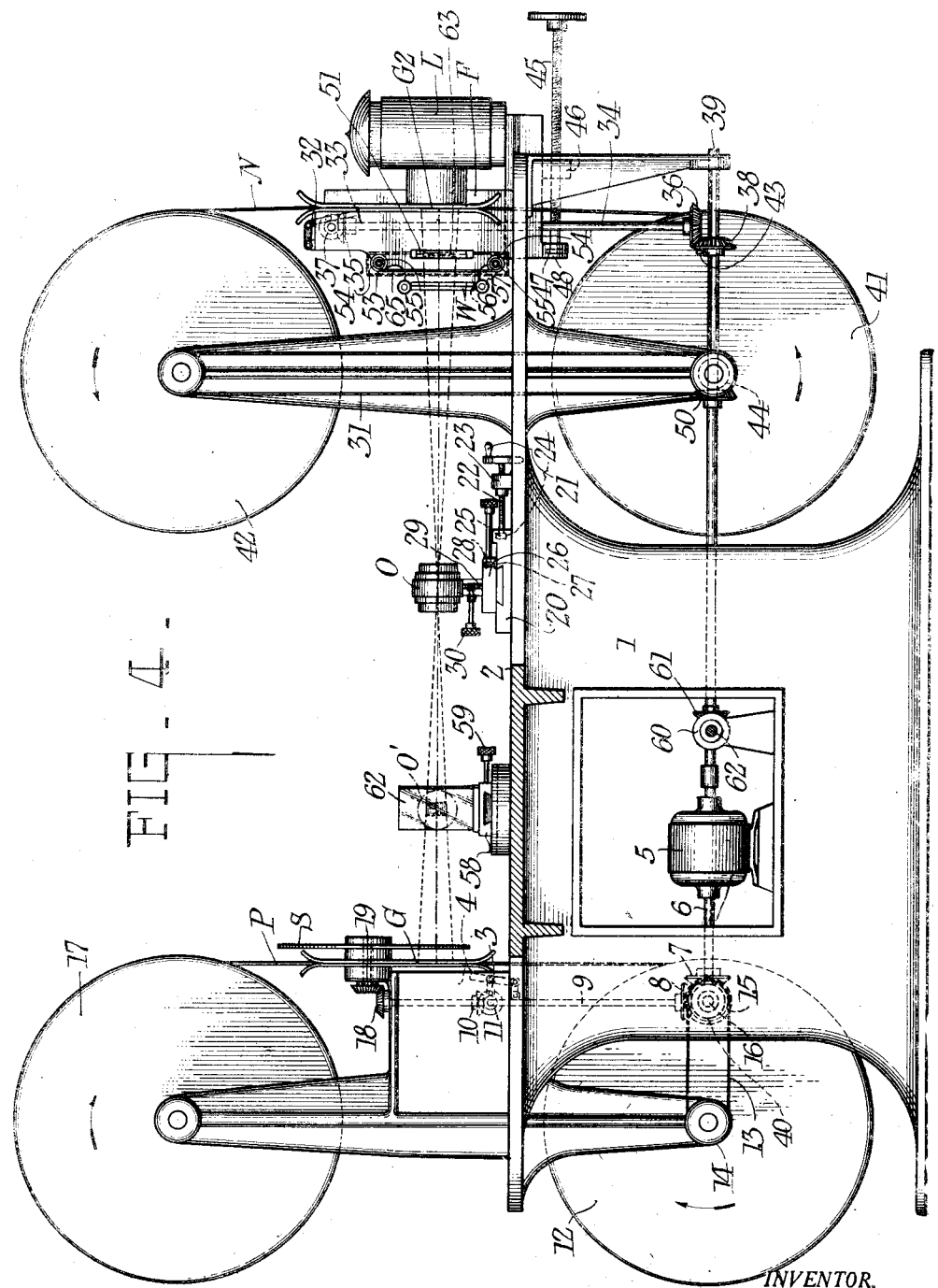

1,704,785

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC PRINTER AND METHOD OF PRINTING.

Application filed December 11, 1925. Serial No. 74,867.

This invention relates to a photographic multiple projection printer and process of printing, and more particularly to an apparatus and process whereby trick or composite motion pictures may be made during the printing operation rather than in the camera by original exposures as is now customary.

My invention comprises the use of several independent gates past which separate negative films and a positive film are drawn in timed relation, the images of the negatives being projected in superposed relation on the positive. Provision is made for the adjustment of the magnification, position and masking of the several projected images so that they may be combined in any desired manner.

The various objects and aspects of my invention will be apparent from the following description of certain embodiments thereof, reference being made to the accompanying drawings, in all the figures of which the same reference characters denote the same parts.

Fig. 1 is a diagram of my preferred form, showing the location and adjustability of certain component parts.

Figs. 2 and 3 are diagrams of alternative optical systems.

Fig. 4 is a side view of a mechanical structure embodying my preferred form.

In Fig. 1 there is shown an optical diagram illustrative of a system by which my improved method may be readily carried out. A sensitive film P is exposed at a gate G to images projected simultaneously thereon from films N and N' carrying negative images at gates G' and G² where they are illuminated by lamps in lamphouses L and L'. One of these is projected by objective O directly upon the sensitive film, the light being transmitted through the light splitting mirror 62, while the other is projected by objective O' and reflected from mirror 62, the two images being thus superposed and being projected on the sensitive film from the same side.

There are introduced into each projected beam density wedges W and W' by which the intensity of the beams may be independently adjusted and diaphragms or masking devices 63 and 64 by which the size and position of the projected image areas may be adjusted as desired. The objectives, diaphragms and the gates with their attached lamphouses are adjustable freely as indicated by the arrows. Each of the projected images can accordingly be adjusted independently as to its magnification, density, area and position. Moreover, the contrast of the final images can be controlled by printing through the color bands 65 and 66 in the manner described in my copending applications 530,942, filed Jan. 21, 1922 which matured on September 7, 1926 into Patent No. 1,598,956, and 711,480, filed May 6, 1924.

If desired, the gates G' and G² and the lenses O and O' may be side by side as shown in Fig. 2, a partition 69 separating the beams. The objectives have their axes parallel and perpendicular to the gates and have an angular field sufficiently wide to project the image properly and without distortion. The gates G' and G² and the lenses O and O' may be on opposite sides of the gate G and the images of N and N' may be projected on film P at gate G from opposite directions as shown in Fig. 3.

In Fig. 4 is shown an operative machine embodying my invention. Inasmuch as the mechanical details of this apparatus are of the usual kind employed in the design of such machines, I have considered that the showing of these in full in connection with the many possible modifications embodying the principles of my invention would only confuse the disclosure and obscure the real invention. In Figs. 1 to 3, I have, therefore, indicated only the optical arrangements which they are intended to disclose, the details of the mechanism being understood to be analagous to that disclosed in Fig. 4 and to be of any suitable kind familiar to those skilled in the art.

A hollow, rigid base or support 1 is used with a table-like top 2. In or on this support are carried the various elements of the machine. In the machine here shown, a positive film gate G is mounted at one end. A mechanism 3, here shown as of an intermittent type with claws 4, is adapted to engage the usual perforations and pull down the sensitized film P. This mechanism is driven from a motor 5, within the base 1, by any suitable arrangement of shafts and gears such as shaft 6, bevel gears 7 and 8, shaft 9 and bevel gears 10 and 11. The take-up reel 12 is driven by a friction slip belt 13 passing over pulley 14 and driven from pulley 15 which is mounted on shaft 16, driven by a bevel gear 40 in mesh with gear 7. The film P is drawn from the supply reel 17. A shutter S of the familiar rotary sector disc type is driven from shaft 9 by bevel gears 18, 19 in properly timed relation to the pulldown mechanism.

The table 2 supports a lens in a suitable mount O which is adjustable in any direction. Slidable longitudinally of the table is a bed 20 adjustable by means of the screw 22 engaging the internally threaded fixed mount 23 and having an operating handle 21 and a freely turning head 24 engaging a suitable socket 25 in bed 20. Slidable transversely of bed 20 is a second bed 26, adjustable by means of the rack and pinion 27 and thumb nut 28. The mount O is further adjustable vertically on bed 26 by rack and pinion 29 and thumb nut 30.

A frame F is mounted for adjustment longitudinally in a slot of table 2 at the other end thereof. In this is a gate $G^2$ past which a long strip of film N, carrying a series of images, usually negatives made by a photographic process, may be drawn by film advancing mechanism 32, here shown as of an intermittent type with claws 33 adapted to engage the usual perforations in the film and move it in a direction opposite to that of film P past gate G.

Mechanism 32 is carried in frame F in which is mounted on a vertical shaft 34 having upper and lower bevel gears 35 and 36, the gear 35 engaging bevel gear 37 from which mechanism 32 is actuated, and gear 36 engaging bevel gear 38 on shaft 39 driven from motor 5. Gear 38 is splined to shaft 39 and is fixable in longitudinally adjustable position by set screw 43. Frame F is adjustable in the slot (not shown) of table 2 by means of hand screw 45 working in a fixed projection 46 and having a head 47 freely turning in socket 48 in the frame F. Carried by frame F is a lamp house L illuminating the gate G.

The film N is drawn from a supply roll 41 to a take-up reel 42 the latter being frictionally driven by a belt and pulley drive 31 from the bevel gears 44 and 50, the latter being on shaft 39.

Carried by frame F is an adjustable carrier 51 for an adjustable and removable diaphragm or masking device 63 whereby the size and position of the image area to be projected may be adjusted. Any suitable mechanism for this purpose may be used, such, for instance, as that disclosed in the patents to Thalhammer, 1,468,091, Sept. 18, 1923, or Fritz, 1,288,555, Dec. 24, 1918. By changing the masking mechanism and adjusting it, any desired shape, size and position of image area may be projected.

Carried on frame F is a boxing 53 carrying a flexible band 65 colored differentially to control contrast to the photographic image. This is secured to two rolls 54 operated by thumb nuts 55 for any desired setting. Boxing 53 also carries density wedges W adjustable by a double rack and pinion 56 from thumb nut 57 to control the billiancy of the projected image and hence the density of the final photographic image.

Close to gate G is a semi-transparent mirror 62, preferably transmitting and reflecting light uniformly. It is carried by the mount 58 which is axially adjusted by thumb nut 59. It is normally held at 45° to the axis of the projection system including gates F and G and lens O.

Perpendicular to this axis at the point where the mirror intersects it is a second system as already described with reference to Fig. 1. The mechanical structure thereof is analagous to that already fully described, and is not shown in full in Fig. 4. However, there are shown the bevel gears 60 and 61 by which is driven the main shaft 62, having the same functions and relations to the second system as 39 has to the first. The position of the second objective O' with relation to the mirror 62 is also indicated.

The use and operation of the apparatus will be apparent from the above description. Negatives will be taken in the camera in the usual way without any trick work whatever, making this operation easier for the cameraman. Two negative bands so taken and ordinarily of quite distinct and dissimilar subjects which are to be superposed to form a trick or composite picture are run past gates G' and $G^2$ while the sensitive positive film is passing gate G. The relative density, magnification, position and contrast of the two images are controllable to permit of the making of any kind of fade-in, ghost, double-exposure, diffused focus effect, vignetting, border design or other form of trick picture.

It is possible to fade one image in and the other out simultaneously from strips of uniform images without the necessity of passing the sensitive film twice past the gate.

Where I have referred to a negative film from which a print is to be made, it is to be understood that I do not limit myself to a photographic negative, but I intend to include any kind of image, negative or positive, produced by any means.

If desired, straight positive prints may be made from two negatives and these run through gates G' and $G^2$ simultaneously to produce a composite negative from which any member of final positives may be printed. This has the advantages that the positive scenes may be focussed together on the gate G where they may be carefully examined by the operator and judged as positives, and that the combination print need be made but once, all other reproductions being made by straight printing.

The subject matter claimed in this application and particularly the preferred embodiment is disclosed in my co-pending application Serial No. 530,942, filed Jan. 21, 1922 which matured on September 7, 1926, into Patent No. 1,598,956.

It is to be understood that the embodiments herein disclosed are by way of example and that I contemplate as included within my invention all such modifications and equivalents as fall within the scope of the appended claims.

Having thus described my invention, what I claim as new and desire to secure by Letters Patent is:

1. The process of making a doubly printed motion picture film that comprises passing said film through a single exposure gate, simultaneously passing in timed relation thereto two image-bearing films through projection gates, and simultaneously projecting on the same side of the first named film in superposition at the single exposure gate the images of both said second films.

2. The process of making a "dissolve" between two scenes of a motion picture film that comprises passing a sensitzed film through a single exposure gate, simultaneously passing in timed relation thereto, two image-bearing films through projection gates, and simultaneously projecting on the first named film at the single exposure gate the images of both said second films, the intensities of the printing lights of the two projected images being simultaneously varied, one being increased and the other decreased.

3. The process of making a composite motion picture that comprises passing simultaneously a sensitized strip of film through a single gate and a plurality of strips of films bearing visible images of different objects through other separate gates, projecting simultaneously on the first named film at its gate superposed images from the other films at their gates and varying independently the intensities of the projected images.

4. The process of making a composite motion picture that comprises the making on film strips of a plurality of series of images of two different subjects and passing said strips and also a strip of sensitive film simultaneously and in timed relation through a printing apparatus, and light printing said series of images in superposition on the sensitive film, at least one of said series being printed by projection and varying independently the intensities of the projected images.

5. A motion picture film printer comprising a first gate, a plurality of other gates, means for illuminating each of said other gates, interconnected film moving means at the several gates for advancing simultaneously and in timed relation a sensitive film strip past said first gate and a plurality of separate image bearing film strips past said other gates and means for projecting images directly from each of said other gates in superposition upon said first gate.

6. A motion picture film printer comprising a first gate, a plurality of other gates, means for illuminating each of said other gates, interconnected film moving means at the several gates for advancing simultaneously and in timed relation a sensitive film strip past said first gate and a plurality of separate image bearing film strips past said other gates and optical systems for projecting images directly from each of said other gates in superposition upon the same area of said first gate, said other gates and said systems being adjustable to vary the magnification and positions of the projected images.

7. A motion picture film printer comprising a first gate, a plurality of other gates, means for illuminating each of said other gates, means for advancing simultaneously and in timed relation a sensitive film strip past said first gate and a plurality of separate image bearing film strips past said other gates, means for projecting images from each of said other gates upon said first gate, and masking means for varying the boundaries of the projected images.

8. A motion picture film printer comprising a first gate, a plurality of other gates, means for illuminating each of said other gates, interconnected film moving means at the several gates for advancing simultaneously and in timed relation a sensitive film strip past said first gate and a plurality of separate image bearing film strips past said other gates, means for projecting images from each of said other gates in superposition upon said first gate, and means for independently adjusting the intensities of the several projected images.

9. A motion picture film printer comprising a first gate, a plurality of other gates, means for illuminating each of said other gates, interconnected film moving means at the several gates for advancing simultaneously and in timed relation a sensitive film strip past said first gate and a plurality of separate image bearing film strips past said other gates, means for projecting images from each of said other gates in superposition upon said first gate and means for independently adjusting the intensities and magnifications of the several projected images.

Signed at Rochester, New York this 8th day of December, 1925.

JOHN G. CAPSTAFF.